United States Patent
Bergmann

(10) Patent No.: US 6,589,670 B2
(45) Date of Patent: Jul. 8, 2003

(54) COMPOSITE OF METAL FOILS WITH A SOLDERING MATERIAL

(75) Inventor: Andree Bergmann, Lohmar (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/237,409

(22) Filed: Sep. 9, 2002

(65) Prior Publication Data

US 2003/0049483 A1 Mar. 13, 2003

Related U.S. Application Data

(63) Continuation of application No. PCT/EP01/02608, filed on Mar. 8, 2001.

(30) Foreign Application Priority Data

Mar. 8, 2000 (DE) .......................................... 100 11 286

(51) Int. Cl.$^7$ .............................................. B32B 15/01
(52) U.S. Cl. ........................ 428/680; 422/4; 422/900; 428/606; 428/607; 428/615; 428/98; 428/116; 428/118; 428/906; 428/926
(58) Field of Search ................................ 428/680, 606, 428/607, 615, 98, 116, 118, 906, 926; 422/4, 900

(56) References Cited

U.S. PATENT DOCUMENTS

| | | | |
|---|---|---|---|
| 3,482,967 A | 12/1969 | Redden | 420/454 |
| 3,632,319 A | 1/1972 | Hoppin et al. | 228/194 |
| 4,213,026 A | 7/1980 | Duvall et al. | 219/75 |
| 4,900,638 A | * 2/1990 | Emmerich | 428/606 |
| 5,366,139 A | 11/1994 | Jha et al. | 428/606 |

FOREIGN PATENT DOCUMENTS

| | | |
|---|---|---|
| DE | 38 01 884 A1 | 8/1988 |
| DE | 196 10 539 A1 | 9/1997 |
| EP | 0 437 626 A1 | 7/1991 |
| EP | 0 658 633 A2 | 6/1995 |
| JP | 63-157793 | 6/1988 |
| WO | 89/07488 | 8/1989 |
| WO | 97/07923 | 3/1997 |

* cited by examiner

Primary Examiner—Robert R. Koehler
(74) Attorney, Agent, or Firm—Laurence A. Greenberg; Werner H. Stemer; Ralph E. Locher

(57) ABSTRACT

Metal foils are soldered using a soldering material. The metal foils are disposed in layers and/or are wound in layers to form a honeycomb body. An aluminum content of the foils amounts to at least 6 wt. %. The material is based upon nickel and contains 17 to 23 wt. % chromium, 5 to 10 wt. % silicon, 18 to 20 wt. % iron, and less than 0.5 wt. % boron.

7 Claims, 1 Drawing Sheet

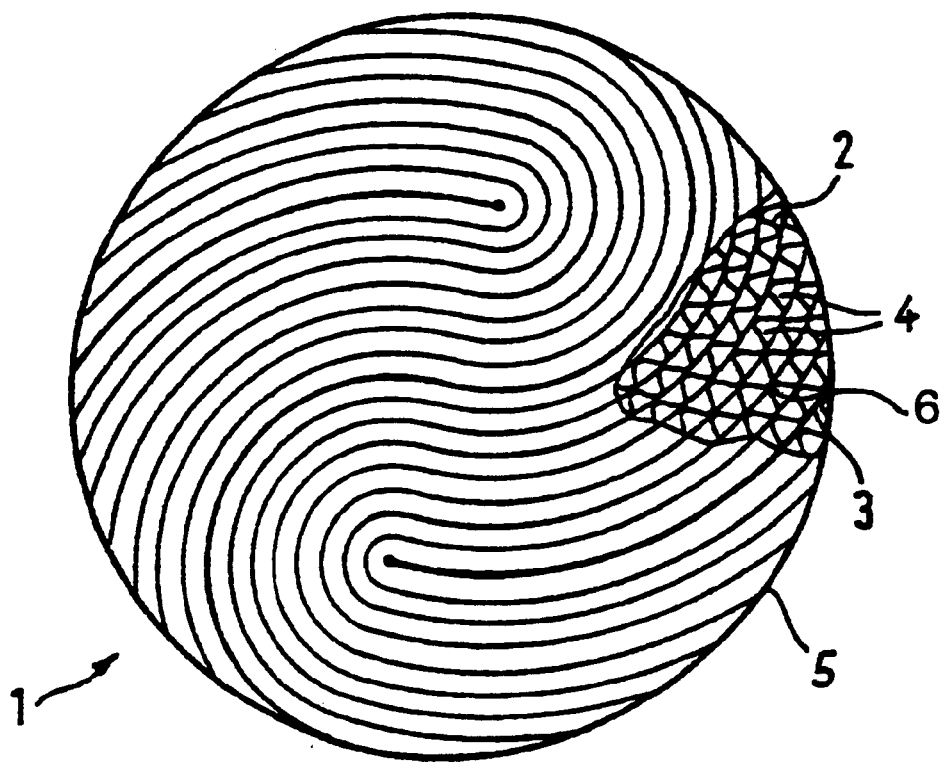

COMPOSITE OF METAL FOILS WITH A SOLDERING MATERIAL

CROSS-REFERENCE TO RELATED APPLICATION

This application is a continuation of copending International Application No. PCT/EP01/02608, filed Mar. 8, 2001, which designated the United States and was not published in English.

BACKGROUND OF THE INVENTION

FIELD OF THE INVENTION

International Patent Disclosure WO 97/07923 discloses a nickel-based soldering material. The soldering material contains between 0.5 and 8% of boron, in particular 3 to 6% of boron. Boron in the soldering material serves as a diffusion accelerator, so that the time required for the soldering process can be shortened. A soldering material of this type is suitable in particular for honeycomb bodies, preferably for the catalytic conversion of gas, in particular of exhaust gases from an internal combustion engine. A honeycomb body of this type contains metal sheets that are stacked and/or wound in layers, the metal sheets at least in part having a structure that leads to the formation of passages through which a fluid can flow. By way of example, International Patent Disclosure WO 89/07488 describes a honeycomb body of this type. The honeycomb body serves as a support for a catalyst that promotes the conversion of components of an exhaust gas, in particular an exhaust gas from an internal combustion engine, into less environmentally polluting compounds. Such honeycomb bodies are exposed to high mechanical and thermal loads. In addition, there are problems with corrosion, since the metal sheets are exposed to an atmosphere that promotes corrosion. It is therefore desirable to use metal sheets with a high resistance to corrosion for the production of the honeycomb body.

It is known from U.S. Pat. No. 5,366,139 that the metal sheets of a honeycomb body include at least one layer of chromium-containing steel and at least one layer that is substantially formed from aluminum. A coated metal sheet of this type is subjected to a heat treatment, during which the metal sheet is substantially homogenized. The term homogenization of the metal sheet is understood as meaning diffusion of the aluminum into steel, so that substantially a single-layer metal sheet of steel with aluminum is formed.

Published, European Patent Application EP 0 437 626 A1 discloses a metallic honeycomb body in which the metal sheets are soldered to one another by a soldering material. The soldering material is a nickel-based material that is substantially free of carbon and chromium and contains 4 to 8% by weight of silicon and 2 to 4.5% by weight of boron.

SUMMARY OF THE INVENTION

It is accordingly an object of the invention to provide a composite of metal foils with a soldering material that overcomes the above-mentioned disadvantages of the prior art devices of this general type, in which the soldering material of the generic type is developed, in particular with a view to the use of metal foils with a high aluminum content. In addition, it is intended to describe a composite of metal foils with a soldering material that is preferably configured as a honeycomb body and has an even longer service life than conventional honeycomb bodies.

With the foregoing and other objects in view there is provided, in accordance with the invention, a composite. The composite contains metal foils having an aluminum content of 6% by weight, and a soldering material disposed adjacent the metal foils. The soldering material is based on nickel and contains 17–23% by weight of chromium, 5–10% by weight of silicon, 18–20% by weight of iron and <0.5% by weight of boron.

In addition to the soldering material, which is explained in more detail below, the composite according to the invention includes metal foils that have an aluminum content of at least 6% by weight. Such a high aluminum content ensures long-term resistance to corrosion, which is necessary in particular when a composite of this type is used in the exhaust system of an internal combustion engine. In this case, the composite is preferably used as support body for catalytically active materials which result in a reaction at temperatures of the exhaust-gas flow of up to 1,000° C. and in this way greatly reduce the level of pollutants in the exhaust-gas stream. Furthermore, the composite of the metal foils with the soldering material ensures a permanent bond that is advantageous in particular with regard to the pressure fluctuations that occur in the exhaust system.

The soldering material is distinguished by the fact that it is a nickel-based material which contains 17 to 23% by weight of chromium, 5 to 10% by weight of silicon, 18 to 20% by weight of iron and less than 0.5% by weight of boron. The soldering material therefore represents a nickel-based solder which, in addition to the alloying elements listed, contains nickel, while there may also be minimal levels of production-related or melting-related impurities present.

High temperatures occur during the soldering operation, leading to the formation of a dense aluminum oxide layer that in particular has a thickness of 0.001 to 0.1 $\mu$m. The dense aluminum oxide layer ensures that the metal foils are resistant to corrosion. Surprisingly, it has emerged that a soldering material having the constituents listed above is suitable for soldering metal foils which have a high aluminum content, since the soldering material results in a lower aluminum depletion of the metal foil in the region of the soldering location compared to soldering locations which are formed using conventional soldering material. Therefore, mixing of aluminum and the described soldering material is almost completely suppressed, and the advantageous aluminum oxide layer on the surface of the metal foils is realized with a relatively uniform thickness in the composite.

A soldering material composition in which the iron content is approximately 20% by weight is preferred. In particular, it is proposed for the boron content to be 0.1% by weight.

Furthermore, it is proposed for the soldering material described to be used for the soldering of metal foils with a thickness of <40 $\mu$m. In the case of thinner metal foils, in particular with thicknesses of less than 25 $\mu$m, the resistance to corrosion is of particular importance; on account of the lower surface-specific heat capacity of the metal foils, they react more sensitively to temperature changes. To avoid undesired diffusion phenomena of the aluminum and/or depletion of aluminum in the region of the soldering location even with such thin metal foils, the proposed soldering agent has proven particularly advantageous.

According to a further configuration of the composite, the metal foils are stacked and/or wound in layers, and a structure for forming passages through which a fluid can flow being formed at least in part, at least some of the metal foils being at least partially joined to one another by the soldering material. The metal foils advantageously form a honeycomb body, preferably for the catalytic conversion of gases, in particular of exhaust gases from an internal combustion engine. A honeycomb body of this type has improved thermal and mechanical properties. The resistance to corrosion is also improved, and consequently the honeycomb body has a longer service life.

Other features which are considered as characteristic for the invention are set forth in the appended claims.

Although the invention is illustrated and described herein as embodied in a composite of metal foils with a soldering material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, partially broken, front-elevational view of a honeycomb body according to the invention.

DESCRIPTION OF THE PREFERRED EMBODIMENTS

Referring now to the single FIGURE of the drawing in detail, there is shown a honeycomb body 1. The honeycomb body 1 contains metal foils 2, 3 that are stacked and wound in layers. The honeycomb body 1 is produced from alternating layers of smooth and undulating (structured) metal foils 2, 3. The honeycomb body 1 which has been produced from the metal foils 2, 3 which have been stacked and wound in layers has a structure which results in the formation of passages 4 through which a fluid can flow in the honeycomb body 1. The sheet-metal layers 2, 3 are disposed in a cladding tube 5. The metal foils 2, 3 have a high aluminum content, in particular an Al content of at least 6% by weight.

The metal foils 2, 3 are joined to one another by soldering. For this purpose, a soldering material 6 can be applied to the locations that are to be joined in the form of a powder. The soldering material 6 may also be placed between the metal foils 2, 3 as a material in strip form. It is preferable for the cladding tube 5 also to be joined to the metal foils 2, 3.

I claim:

1. A composite, comprising:

metal foils having an aluminum content of 6% by weight; and a soldering material disposed adjacent said metal foils, said soldering material based on nickel and containing 17–23% by weight of chromium, 5–10% by weight of silicon, 18–20% by weight of iron and <0.5% by weight of boron.

2. The composite according to claim 1, wherein said iron has a content of approximately 20% by weight.

3. The composite according to claim 1, wherein said boron has a content of approximately 0.1% by weight.

4. The composite according to claim 1, wherein said metal foils have a thickness of less than 40 μm.

5. The composite according to claim 1, wherein said metal foils are at least one of stacked and wound in layers forming a structure having passages formed therein through which a fluid can flow, and at least some of said metal foils are at least partially joined to one another by said soldering material.

6. The composite according to claim 5, wherein said metal foils form a honeycomb body.

7. The composite according to claim 6, wherein said honeycomb body catalytically converts gases, including exhaust gases from an internal combustion engine.

* * * * *